United States Patent
Oshita et al.

(10) Patent No.: US 6,761,107 B2
(45) Date of Patent: Jul. 13, 2004

(54) BREAD BAKING MACHINE

(75) Inventors: Takahiro Oshita, Hyogo (JP); Shigeru Yamaguchi, Osaka (JP); Toru Hanada, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/419,864

(22) Filed: Apr. 22, 2003

(65) Prior Publication Data

US 2004/0020372 A1 Feb. 5, 2004

(30) Foreign Application Priority Data

Apr. 23, 2002 (JP) ........................................ 2002-120443
Aug. 1, 2002 (JP) ........................................ 2002-224566
Mar. 4, 2003 (JP) ........................................ 2003-056863

(51) Int. Cl.$^7$ ............................ A23L 1/00; A47J 27/00; A21D 8/00
(52) U.S. Cl. ............................ 99/327; 99/331; 99/348; 99/468; 366/98; 366/146; 366/314
(58) Field of Search ........................... 99/326–334, 348, 99/352–355, 467, 468, 483, 484, 486; 366/69, 96–98, 144–146, 314, 601; 426/231–233, 504, 512, 523

(56) References Cited

U.S. PATENT DOCUMENTS

| 5,615,605 | A | | 4/1997 | Kakimoto et al. |
| 5,766,661 | A | * | 6/1998 | Lee .............................. 426/231 |
| 5,947,005 | A | * | 9/1999 | Sit et al. ........................ 99/326 |
| 6,035,763 | A | * | 3/2000 | Yung ............................ 99/348 |
| 6,113,966 | A | * | 9/2000 | Belongia et al. ............ 426/496 |
| 6,217,924 | B1 | * | 4/2001 | Sit et al. ...................... 426/233 |

FOREIGN PATENT DOCUMENTS

| JP | 9-117375 | 5/1997 |
| WO | 98/09527 | 3/1998 |

* cited by examiner

Primary Examiner—Timothy F. Simone
(74) Attorney, Agent, or Firm—Wenderoth, Lind & Ponack, L.L.P.

(57) ABSTRACT

A bread baking machine of the invention has a gasket for sealing and a magnetic metal fitting A constituting a locking means, both provided on a container cover which opens and closes an opening above a lid container placed in an outer cover for storing supplementary ingredient of bread and for entering it automatically. The bread baking machine can thus lock the lid container and the container cover while keeping the gasket depressed against a sealing surface. Since this structure ensures the gasket to seal a space between the lid container and the container cover, it can prevent dew condensation and thermal deformation of components due to leakage of hot steam.

40 Claims, 14 Drawing Sheets

BREAD BAKING MACHINE

FIELD OF THE INVENTION

The present invention relates to a bread baking machine for use mainly in an ordinary household and capable of baking bread automatically by simply providing it with prescribed ingredients for bread.

BACKGROUND OF THE INVENTION

With increase in variety and luxury of eating habits, there is a trend in recent years of baking bread in home with a home-use bread baking machine, such as raisin bread, nut bread, cheese bread and the like by adding such supplementary ingredients as raisins, nuts and cheese.

A bread baking machine of such kind is described, as an example, in Japanese Patent Unexamined Publication, No. H09-117375. FIG. 9 is a sectional view of the bread baking machine of the prior art disclosed in the publication H09-117375.

In FIG. 9, chassis 2 placed in main body 1 secures baking chamber 4, which is provided therein with heater 3 defining heating means, by holding it to the upper side thereof with bread container mount base 5. Chassis 2 also secures motor 6 mounted to the lower side of it. In addition, chassis 2 secures main body 1 made of a sheet metal by holding it at its bottom end with bottom plate 7. Outer cover 8 opens and closes baking chamber 4. Bread container 9 is disposed removably to bread container mount base 5. Kneading blade 10 defining mixing/kneading means is axially supported upwardly in a freely rotatable manner by spindle 11 at the center bottom portion in bread container 9, and it is rotated by motor 6. Control unit 12 controls power supply to heater 3 and motor 6.

The bread baking machine constructed as above operates in a manner which is described hereinafter. When bread ingredients are put into bread container 9 and the baking machine operated, it controls heater 3 and motor 6 to proceed with a mixing/kneading process, a fermenting process and a degassing process of dough in a sequential manner, and finally performs a baking process to bake bread by heating the interior of baking chamber 4 to as high a temperature as 150° C. to 200° C. Although the bead making process varies depending on kinds of bread to make, it takes approximately 2 to 7 hours of time to complete the entire process. In the case of making any of raisin bread, nut bread, cheese bread and the like by adding supplementary bread ingredient such as raisins, nuts and cheese, it has been the ordinary practice to start the bead making process with the supplementary bread ingredient added together with such main bread ingredients as flour, water, butter, sugar, salt, yeast and the like into bread container 9 from the beginning of operation. Or, in certain cases depending on a machine, the practice has been such that the machine gives the user a signal when approximately 17 minutes has elapsed out of approximately 20 minutes of the mixing/kneading process, to notify the user of a timing for addition of the supplementary bread ingredient, so as to let the user add the supplementary ingredient manually and continue to mix the supplementary ingredient with the main bread ingredients for the remainder of about 3 minutes in the process.

The bread baking machine disclosed in the publication H09-117375 is devised on the basis of the above bread baking process, and designed to introduce the supplementary ingredient at a time, which differs from the bread baking process, in order to improve convenience of use and diversification of finished results. Referring now to FIG. 10A and FIG. 10B, description is provided hereinafter of a structure for introducing the supplementary ingredient.

FIG. 10A shows a detachable structure of a lid container. As shown in FIG. 10A, supplementary ingredient enter means comprises lid container 13 for storing supplementary bread ingredient to be added, shutter plate 14 for opening and closing the bottom of lid container 13, and container cover 20 for opening and closing the top of lid container 13 when putting the supplementary bread ingredient, and it is designed to enter the supplementary bread ingredient into bread container 9 by tilting lid container 13 around container axes 15 serving as fulcra, in a conjugate motion with shutter plate 14. This structure can ensure reliable and accurate enter of the supplementary bread ingredient into bread container 9. In addition, lid container 13, when made of plastic resin, can alleviate temperature rise of lid container 13, so as to prevent risk of burn and improve safety.

Furthermore, FIG. 10B shows an operating mechanism of the lid container. As shown in FIG. 10B, enter of supplementary ingredient 19 is made by solenoid 16, which pushes axis lever 18 via lever 17 to open shutter plate 14 to baking chamber 4, and tilts lid container 13 around container axis 15 in the same way as shutter plate 14. This allows supplementary ingredient 19 inside lid container 13 to slide down lid container 13 in a slide-like manner, and is entered into bread container 9. Since lid container 13 gets closer into bread container 9 and supplementary ingredient 19 slides down in the slide-like manner when tilted, this structure can enter supplementary ingredient 19 without scattering outside of bread container 9.

In the structure of the prior art, shutter plate 14 needs to be closed after supplementary ingredient 19 is entered in order to prevent hot air from being escaped toward container cover 20 when the bread is being baked. However, there are occasions that the slide-like surface is not completely closed, leaving a space around shutter plate 14. Also, because a complete seal is not achieved and spaces left open between container cover 20 and lid container 13, or between container cover 20 and cover 8, hot air containing steam produced in the process of baking bread escapes from around container cover 20, thereby causing dew condensation in the vicinity of it. Furthermore, if the baking machine is operated empty due to misuse in which bread container 9 is not set in place inadvertently, the air escaping from around container cover 20 rises to even a higher temperature, which could result in a thermal deformation of cover 8 surrounding container cover 20.

Moreover, since an inner wall of lid container 13 is formed flat, supplementary ingredient of highly adhesive material such as raisins, bananas and the like preserved in liquor, when used, sticks to the inner wall surface, and the supplementary ingredient often stays inside lid container 13 without sliding down, even after shutter plate 14 is opened. Furthermore, since lid container 13 has an open end at the enter side rather than a complete shape of four-sided container, it has a problem that the ingredient contained therein could be slipped off easily when lid container 13 is carried with the supplementary ingredient in it.

In addition, lid container 13 is not easy to handle when attaching and detaching it to and from the baking machine, since it is not practical to have any form of projections or depressions and not provided with a grip handle for a reason of preventing the supplementary ingredient from being caught therein and/or maintaining a sufficient capacity and ease of storage. It is especially difficult to handle for attaching and detaching lid container 13 without spillage when it contains the supplementary ingredient.

SUMMARY OF THE INVENTION

The present invention provides a bread baking machine which comprises a bread container for mixing, kneading and heating bread ingredients, a baking chamber provided with a heater, a lid for opening and closing the baking chamber, a lid container provided in the lid for storing a supplementary ingredient of the bread, a container cover for opening and closing the lid container, a gasket provided between the lid container and the container cover, a enter means for opening the bottom of the lid container to enter the supplementary ingredient into the bread container, a control means for controlling a baking process, and a locking means for locking the lid and the container cover, wherein the bread baking machine uses the locking means to lock the lid and the container cover to prevent hot air from leaking to the outside through the periphery of the container cover.

DESCRIPTION OF THE PREFERED EMBODIMENTS

Exemplary embodiments of the present invention will now be described with reference to the accompanying drawings.

(First Exemplary Embodiment)

Figure 1:
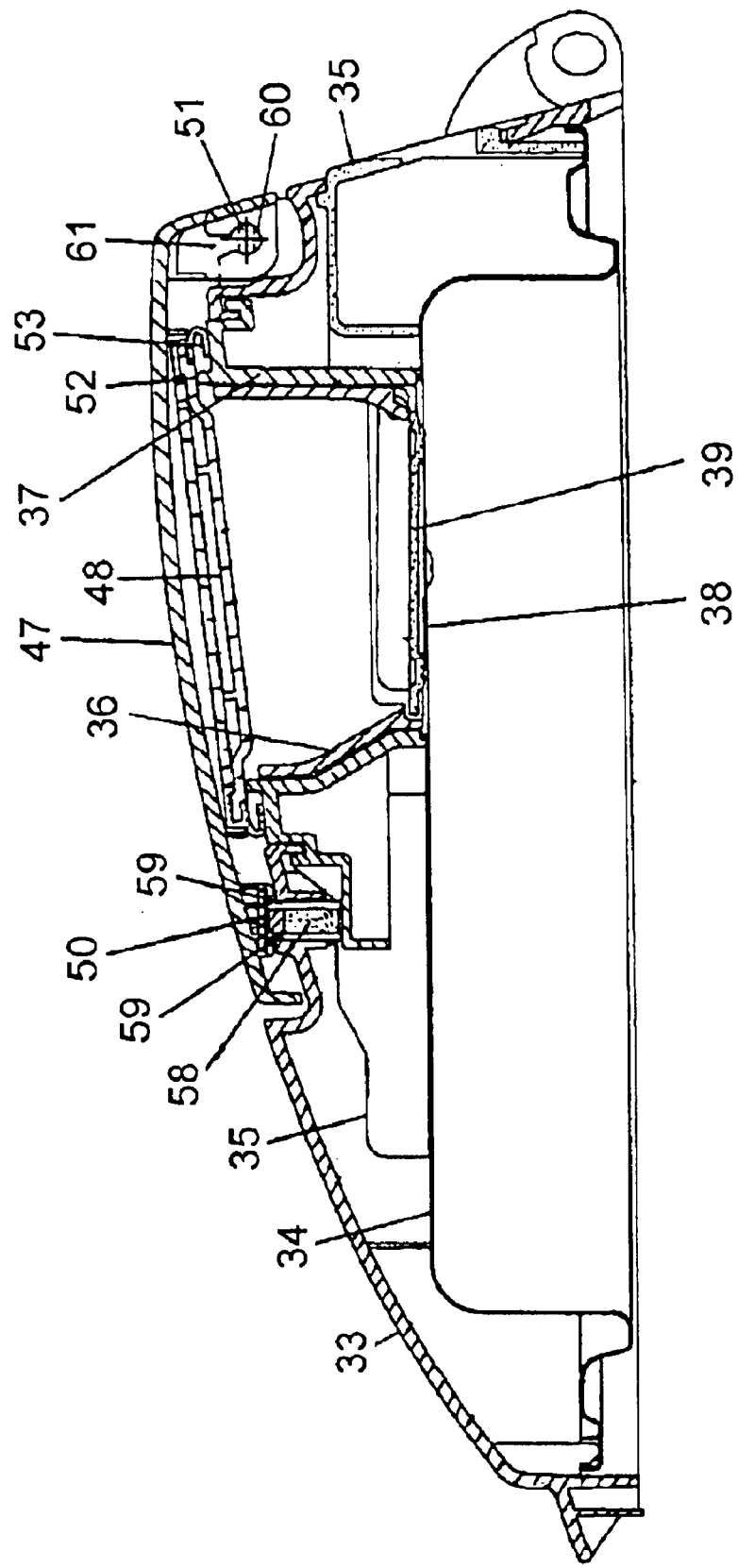
FIG. 1 is a cross sectional view of a lid of a bread baking machine according to a first exemplary embodiment of the present invention.
Figure 2:
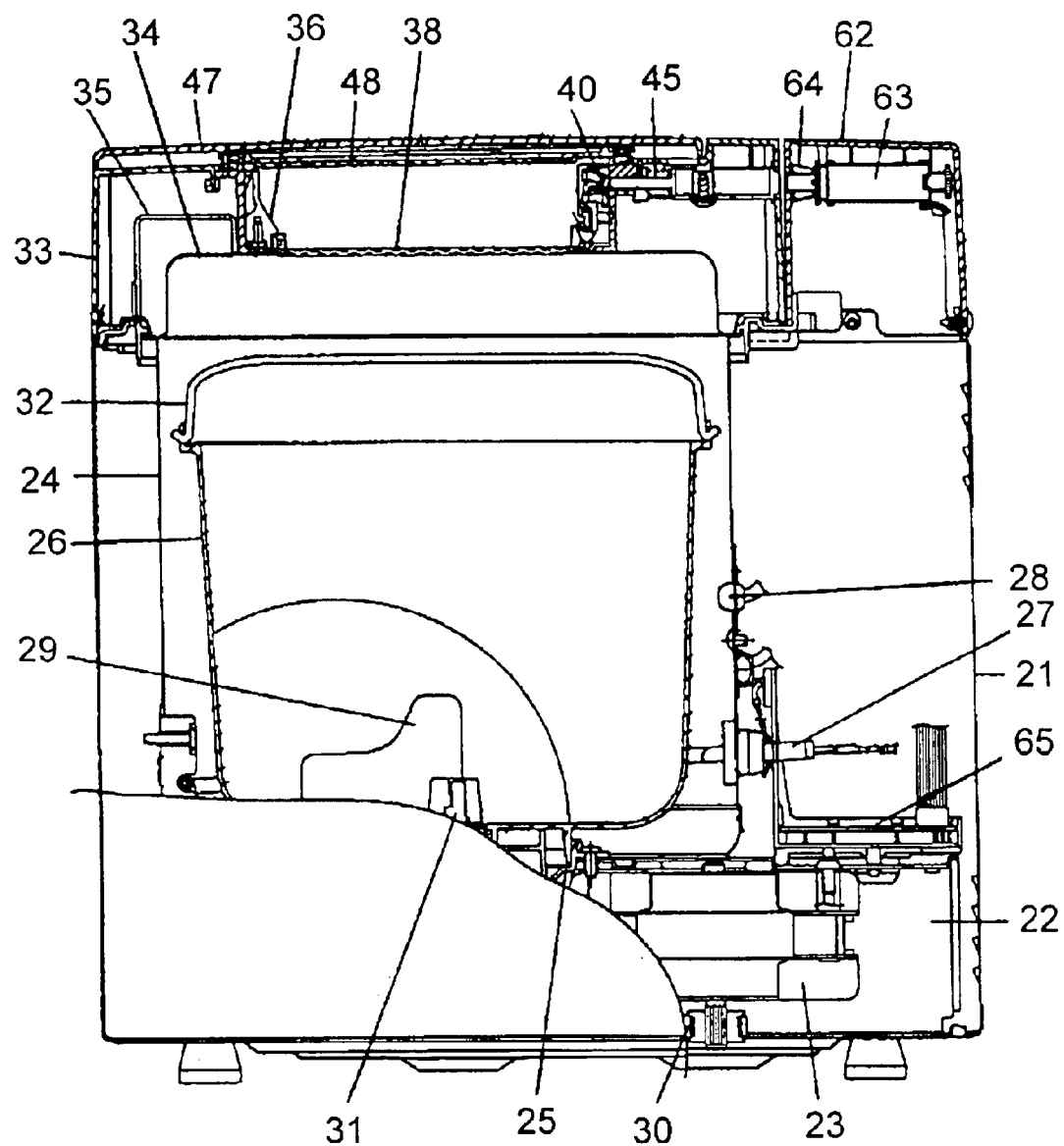
FIG. 2 is a longitudinally sectioned view of the bread baking machine according to the first exemplary embodiment.
Figure 3:
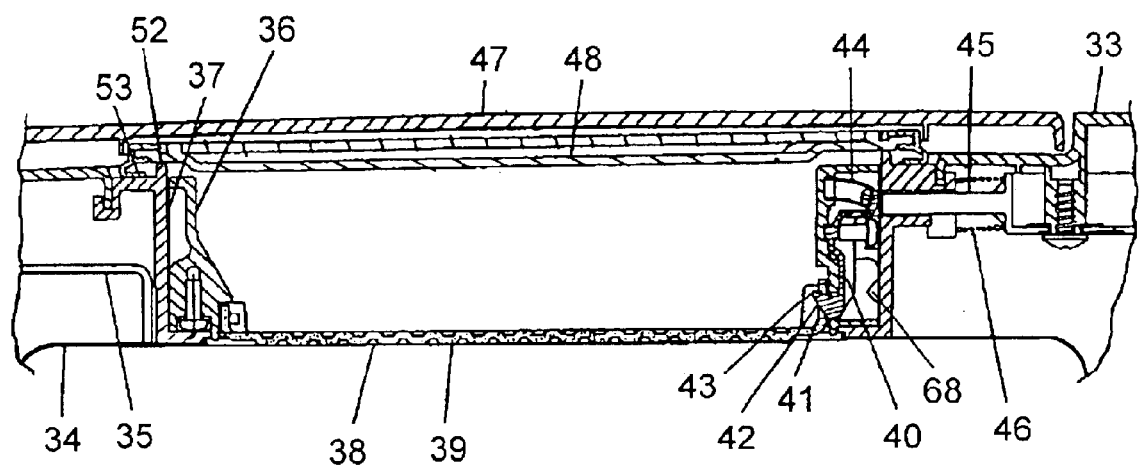
FIG. 3 is a longitudinally sectioned view showing a main portion of a lid of the bread baking machine according to the first exemplary embodiment.
Figure 4A:
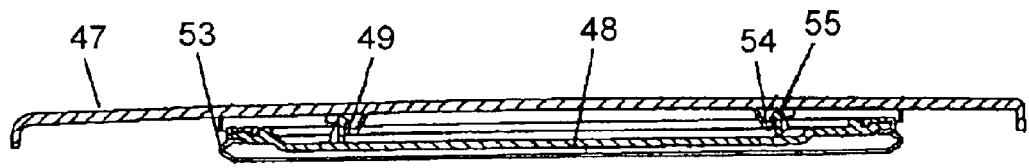
FIG. 4A is a longitudinally sectioned view of a container cover of the bread baking machine according to the first exemplary embodiment.
Figure 4B:
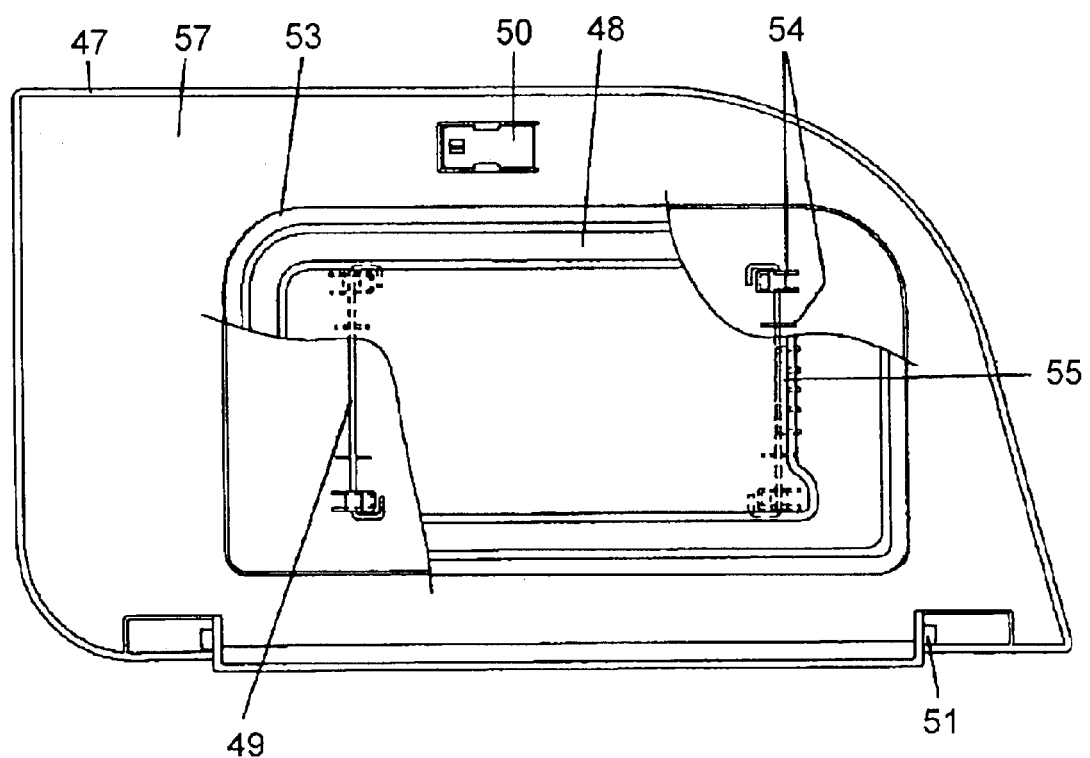
FIG. 4B is a plan view showing a back side of the container cover of the bread baking machine of the first exemplary embodiment.
Figure 5B:
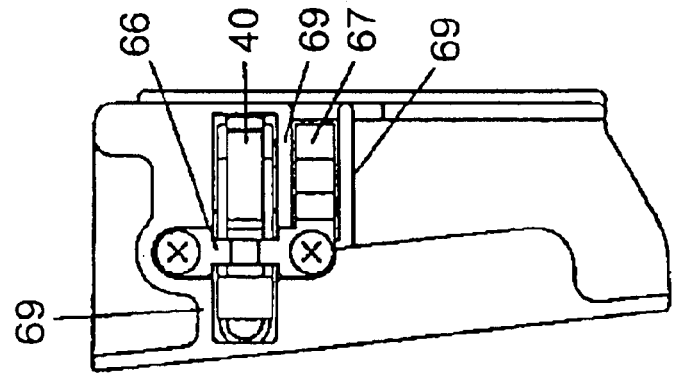
FIG. 5B is a right side view of the lid container of the bread baking machine according to the first exemplary embodiment.
Figure 5A:
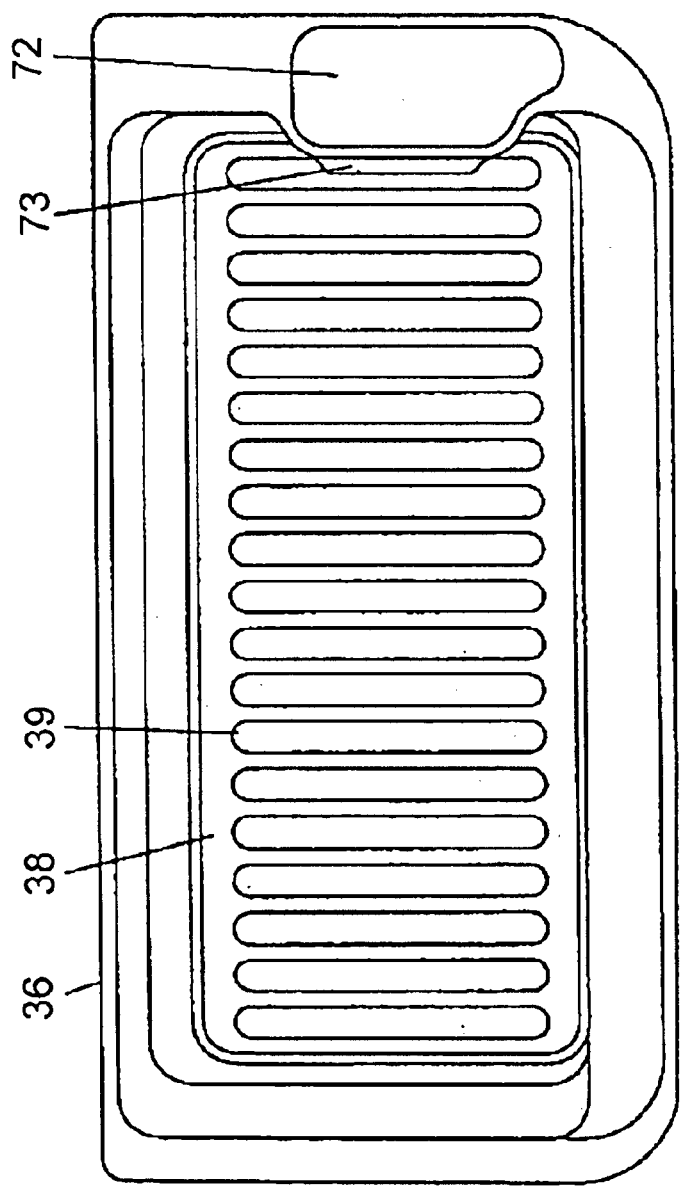
FIG. 5A is a plan view of a lid container of the bread baking machine according to the first exemplary embodiment.
Figure 6A:
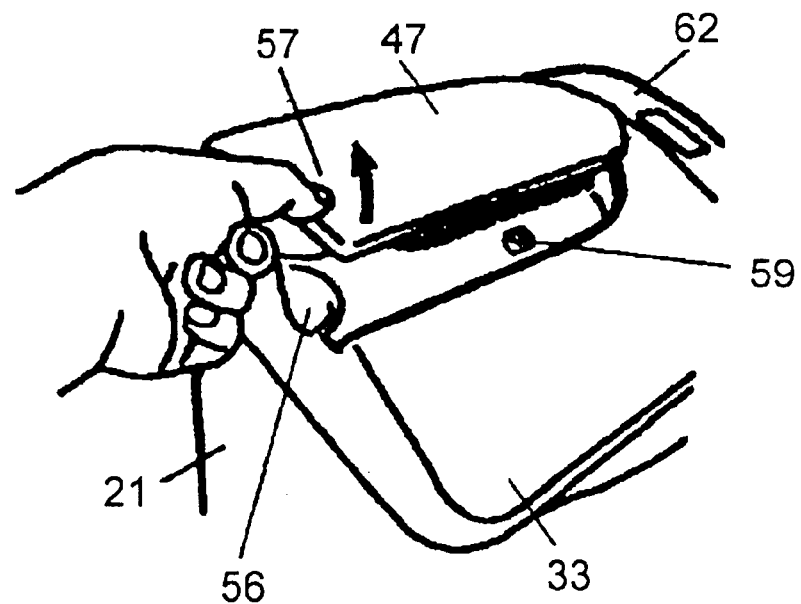
FIG. 6A is a perspective view showing how the container cover of the bread baking machine is opened.
Figure 6B:
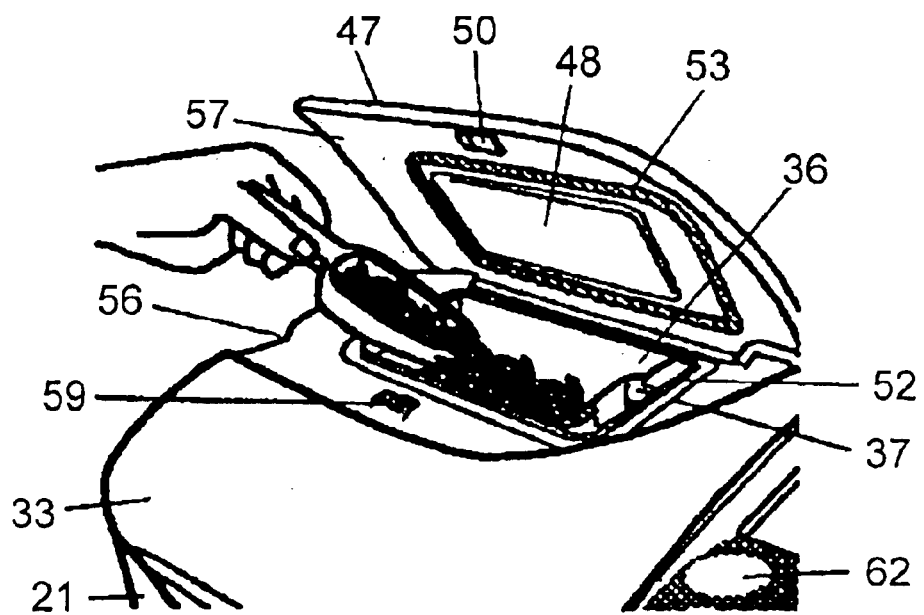
FIG. 6B is a perspective view showing how supplementary ingredient is put into the lid container of the bread baking machine.

FIG. 1 is a cross sectional view of a lid of a bread baking machine according to a first exemplary embodiment of the present invention, FIG. 2 is a longitudinally sectioned view of the same bread baking machine, FIG. 3 is a longitudinally sectioned view of a main portion of the lid of the same bread baking machine, FIG. 4A is a longitudinally sectioned view of a container cover of the same bread baking machine, FIG. 4B is a partially sectioned plan view showing a back side of the same container cover, FIG. 5A is a plan view of a lid container of the same bread baking machine, FIG. 5B is a right side view of the lid container of the same bread baking machine, FIG. 6A is a perspective view showing how the container cover is opened, and FIG. 6B is another perspective view showing how supplementary ingredient is put into the lid container.

In FIG. 1 through FIG. 6B, main body 21 is constructed of a sheet metal and chassis 22 is mounted to this main body 21. This chassis 22 has motor 23, baking chamber 24 and container mount base 25, all mounted thereto. Baking chamber 24 is provided in its inside with freely removable bread container 26 for putting bread ingredients, heater 27, and temperature detector 28 for sensing a temperature inside baking chamber 24. Furthermore, bread container 26 is provided with kneading blade 29 for mixing and kneading the bread ingredients, rotary axle 31 connected to kneading blade 29 and driven by motor 23 via belt 30, and handle 32 to be held when bread container 26 is removed and carried.

Outer cover 33 has venting duct 35 for venting steam inside of interior cover 34 and baking chamber 24 to the outside. Outer cover 33 functions as a lid to open and close baking chamber 24, and it is attached to main body 21 in a freely turnable manner. Lid container 36 stores supplementary bread ingredient such as raisins, nuts and the like, and it is disposed in a freely removable manner to the inside of outer cover 33 above bread container 26. Lid container receptacle 37 is arranged around the periphery of lid container 36. Shutter plate 38 defining a enter means is mounted in a freely turnable manner to lid container 36, and it opens and closes an opening located underneath lid container 36. Shutter plate 38 has a plurality of ridges and ditches 39 formed over its surface, and covered with fluorine coating so as to prevent the supplementary bread ingredient from sticking to it. Latching member 40 for latching shutter plate 38 is turnably attached to lid container 36, and one end of it has hook 42 for engagement with poly-angular hole 41 formed in shutter plate 38. Hook 42 has protrusion 43 formed on a tip end thereof. Spring-A 44 provides latching member 40 with a thrusting force in a direction to move hook 42 into engagement with poly-angular hole 41. Lid lever 45 is mounted in a freely slidable manner to the inside of outer cover 33, and it slides and depresses one end of latching member 40 to open shutter plate 38 when entering the supplementary bread ingredient. Lid lever 45 normally stays inside of lid container receptacle 37 by a thrusting force of spring-B 46. Grip 72 is formed in a shape of concavity and into a size to fit a finger tip. Rib 73 is formed at one side of opening of grip 72 to serve as a stopper for avoiding the finger tip from slipping when it is gripped. Leaf spring 66 is a means to attach latching member 40 to lid container 36 in a freely turnable manner, and it has fixing tab 67 formed integrally at one end to be fixed to lid container receptacle 37. Fixing tab mount 68 is provided on lid container receptacle 37, and ribs or barriers 69 for engagement with fixing tab 67 are formed in a manner to encircle the perimeter of leaf spring 66 and latching member 40. All of latching member 40, grip 72 and leaf spring 66 are arranged on a same surface at the right side of lid container 36.

Container cover 47 is attached to outer cover 33 in a freely turnable and removable manner for opening and closing lid container 36, and it is provided with inner cover 48 constructed of a material having high resistance to heat for directly opening and closing an upper opening of lid container 36, a plurality of fixing members 49 made of wire rods such as piano wires and the like for movably mounting inner cover 48, magnetic metal fitting A 50, and a plurality of hinges 51 formed by cutting both sides of a round shaft into the shape of the letter D. Inner cover 48 abuts directly upon rib 52 formed in a protruding manner around the entire inner perimeter of an upper surface of lid container receptacle 37, and gasket 53 made of heat resistant silicon rubber is attached to an outer periphery of it. Gasket 53 is pressed upon the upper surface of lid container receptacle 37, and the upper opening of lid container 36 is completely sealed with gasket 53 when inner cover 48 is closed. Container cover 47 is provided with a plurality of fixing ribs 54, to which fixing member 49 is mounted. Inner cover 48 is provided with a plurality of hooks 55, and they are engaged to fixing member 49 in a manner to maintain a small space to both fixing member 49 and container cover 47, so as to attach inner cover 48 freely movably to container cover 47 with play in directions of front to back, left to right, and up to down.

Recess 56 is formed in a top surface at the left side of outer cover 33 for easy access of a finger to hold and open container cover 47, so that grip area 57 can be held when opening and closing container cover 47. Magnet 58 and magnetic metal fittings B 59 are placed and secured between outer cover 33 and lid container receptacle 37 in a location between hinges 51 and grip area 57 in such a manner that only end faces of magnetic metal fittings B 59 are exposed outside through outer cover 33, so that they attract magnetic metal fitting A 50 with magnetic force of magnet 58. Gasket 53 is disposed to a place between the locking means comprised of magnetic metal fitting A 50, magnetic metal fittings B 59 and magnet 58, and hinges 51 of container cover 47.

Outer cover 33 is provided with catch openings 60 in which hinges 51 of container cover 47 are fitted. Each of catch openings 60 has slit 61 in the upper side, so that container cover 47 can be removed from outer cover 33 when it is opened up to a predetermined angle and pulled frontward. Controller panel 62 is located at the right side of a front panel as facing toward the machine, and it is used for selection of menu, start of baking operation, and the like. Solenoid 63 is disposed to controller panel 62, and it pushes lid lever 45 to open shutter plate 38. Spring-C 64 gives a thrusting force to a sliding member of solenoid 63, which pushes lid lever 45, in a direction of retracting the sliding member inside of controller panel 62. Controller unit 65 defining control means controls power supply to motor 23, heater 27 and solenoid 63, and it carries out the bread baking process of preheating, mixing/kneading, fermenting and baking automatically according to temperature data taken by temperature detector 28.

The bread baking machine constructed as above operates in a manner which is described hereinafter. In the case of baking bread using supplementary ingredient such as raisins, nuts and the like, a first step is to put main bread ingredients such as flour, yeast, sugar, salt, dry milk, butter, water and so on into bread container 26. After this bread container 26 is set on container mount base 25 inside baking chamber 24, and outer cover 33 is closed, container cover 47 is now opened, the supplementary ingredient such as raisins and nuts is placed in lid container 36, and container cover 47 is closed, as shown in FIG. 6A and FIG. 6B. In this case, protrusion 43 provided at the tip end of hook 42 is caught in poly-angular hole 41, which makes hook 42 not likely to slip out easily from poly-angular hole 41, and protrusion 43 can therefore prevent the shutter plate from opening unintendedly, even though an upper face of hook 42 receives a downward pressure due to a weight of the supplementary ingredient and a thrusting force impressed on shutter plate 38 when setting the supplementary ingredient. Next, when the user pushes a key on controller panel 62 and selects a menu of bread using the supplementary ingredient, and again pushes a start key, the baking machine starts a preheating process to keep the main bread ingredients at a predetermined temperature, followed by a mixing/kneading process in which the main bread ingredients are mixed and kneaded by rotating kneading blade 29 intermittently. Kneading blade 29 stops rotating when the kneading is advanced sufficiently, and bread dough is formed. Solenoid 63 is then activated for 1.5 seconds, for instance, to eject the sliding member of solenoid 63 sideward, which depresses one end of latching member 40 via lid lever 45. This turns latching member 40 to pull out hook 42 from poly-angular hole 41, opens shutter plate 38 by the weight of the supplementary ingredient in addition to its own weight, and enters the supplementary ingredient into bread container 26 underneath lid container 36. The mixing/kneading process starts again, and the supplementary ingredient is kneaded uniformly into the dough.

Subsequently, the bread is baked by going through the fermenting process and the baking process with shutter plate 38 remains open. Because gasket 53 made of high heat resistant silicon rubber having flexibility for sealing purpose is disposed to inner cover 48 for opening and closing the upper opening of lid container 36, and that magnet 58 causes magnetic metal fittings B 59 to attract magnetic metal fitting A 50 to thereby lock container cover 47 and inner cover 48 in the closed position, the structure here can ensure locking of container cover 47 and inner cover 48 with gasket 53 pressed against an upper surface of lid container receptacle 37 constituting the sealing surface into such a state that a lip of gasket 53 deforms as it makes a compressed contact with the upper surface of lid container receptacle 37. Therefore, gasket 53 can substantially seal up a space between the outer periphery of lid container 36 and inner cover 48 even if there is a certain extent of unevenness in their sealing surfaces, since it can be absorbed by deformation of the lip, so as to avoid dew condensation and thermal deformation of outer cover 33 and container cover 47. Expression here of "substantially seal up" means any way of sealing up the space properly, or to such an extent that any of the structural members of the lid and the like does not receive dew condensation or any damage of heat deformation and the like, even if a small amount of hot air escapes from a part of the gasket.

In the description given above, this exemplary embodiment employs gasket 53 attached to inner cover 48, which is a separate component mounted to container cover 47. However, like advantageous effect can be achieved by omitting inner cover 48, forming container cover 47 with a material of high heat resistance, and disposing gasket 53 directly to container cover 47. Moreover, although lid container 36 is shown as having a removable structure in the first exemplary embodiment, like advantage can be achieved even with a structure in which lid container 36 is fixed. When this is the case, the lid container receptacle becomes unnecessary.

Furthermore, the above structure can press gasket 53 against the upper sealing surface of lid container receptacle 37 with a stronger force than the attractive force of magnet 58 according to the principle of lever, as gasket 53 is placed between the locking means comprising magnetic metal fitting A 50 and hinges 51. Also, because of this structure, in which the locking means comprising magnetic metal fitting A 50 and magnet 58 is positioned between hinges 51 and a portion of grip area 57 and recess 56, container cover 47 can be opened and closed with a weaker force than the attractive force of magnet 58 according to the same principle as above. In other words, this structure can reduce the force required to open and close container cover 47 while providing a strong force to press gasket 53 against the sealing surface, thereby realizing easiness in the open and close operation of container cover 47 while improving tightness of the seal at the same time.

In the first exemplary embodiment, although the locking means is constructed of magnetic metal fitting A 50, magnetic metal fittings B 59, and magnet 58, this is not restrictive, and that the locking means may be made of a push latch used as a lock for doors of hidden control knobs in a television set and the like. Or, the locking means may be comprised of a butterfly screw. That is, the butterfly screw is attached to outer cover 33, and container cover 47 is provided with a hole in a shape analogous to an external shape of the butterfly screw, thereby the container cover 47 can be opened when the butterfly screw is twisted to the same orientation as to match the hole, and container cover 47 can be locked when the butterfly screw is twisted to a discordant orientation with the hole. Alternatively, the locking means of container cover 47 may be constructed by providing outer cover 33 with a turnable latching tab similar to the ones used for locking a screen on the back of a photograph stand. Besides the above, locking means of a turning lever type may be used as similar to those used for locking a pair of glass doors.

Also, gasket 53 is attached to inner cover 48 of a separate component from container cover 47, and this inner cover 48 is mounted to container cover 47 freely movably in the directions of front to back, left to right, and up to down. This structure can thus maintain tightness of the seal substantially, since inner cover 48 is pressed against and along a sealing surface of lid container receptacle 37 by its own weight and the attractive force of magnet 58, even if there is unevenness in the sealing surface due to deviations in flatness and dimension of the upper surface of lid container receptacle 37 constituting the sealing surface and condition of the assembly. Expression here of "substantially" means a way of sealing up the space properly, or to such an extent that does not cause any damage to the surrounding component members, as previously described. In addition, because inner cover 48 of separate component is used as the component located above container cover 47, where exposure to high temperature is inevitable when shutter plate 38 is opened, it is not necessary to use a costly material of high heat resistance to fabricate container cover 47. Since this structure can decrease a surface temperature of container cover 47 which constitutes an external enclosure, it improves safety in addition to a cost reduction. Moreover, because gasket 53 can be attached to the outer perimeter of inner cover 48, this structure can further improve easiness of assembling as compared to attaching it to the center area of container cover 47.

With respect to installation of gasket 53, it should be considered effective when of gasket 53 is attached to any of container cover 47, inner cover 48, and both of container cover 47 and inner cover 48, as described above.

Furthermore, this structure makes use of a screw unnecessary for mounting inner cover 48, since it has fixing members 49 made of wire rods such as piano wires attached to the right and left sides of container cover 47, and inner cover 48 is mounted by engaging hooks 55 provided at the right and left sides of it with these fixing members 49. As a result, both container cover 47 and fixing members 49 are isolated from the heat by inner cover 48 formed of the plastic resin of high heat resistance, and they are therefore not heated to high temperature. This can thus prevent container cover 47 from developing abnormalities such as thermal deformation, thermal deterioration and the like, even if fixing members 49 receive a stress such as the own weight and the like of inner cover 48. Since the structure can also allow mounting of inner cover 48 in the freely movable manner to container cover 47, it can maintain tightness of the seal properly while ensuring reliability in resistance to heat.

Furthermore, this structure is such that removable lid container 36 is disposed in position, and rib 52 is provided in a protruding manner above the inner periphery of lid container receptacle 37 arranged around the outer periphery of lid container 36, so that inner cover 48 comes in abutment with rib 52 substantially over the entire periphery of it at the interior side of gasket 53. Therefore, since inner cover 48 and rib 52 come in abutment substantially over their entire periphery as long as container cover 47 is closed even if lid container 36 is not placed in error, the heat can be sealed inside gasket 53 even though an upper space of lid container 36 is exposed to high temperature after shutter plate 38 is opened. In addition, because gasket 53 seals the outside of rib 52, it can prevent thermal deformation of outer cover 33 and container cover 47 in the vicinity of lid container receptacle 37. Moreover, since rib 52 provided inside of gasket 53 is in abutment with inner cover 48, hot steam is not likely to reach the space of gasket 53, so as to reduce thermal stress imposed upon gasket 53 and to prevent thermal deterioration and thermal aging of gasket 53. The expression of "substantially" here means such a condition that rib 52 has generally the same function as if it is in abutment with inner cover 48 over the entire periphery, even if any part of it is not in abutment thereon.

Furthermore, gasket 53 is so arranged as to keep the seal by making it in contact with the upper surface of lid container receptacle 37 around its periphery, but without extending over lid container 36. Since this structure maintains the same seal tightness without changing condition of the seal even if lid container 36 is not placed in careless error, it can prevent thermal deformation of outer cover 33 and container cover 47 in the vicinity of lid container receptacle 37.

Figure 7:
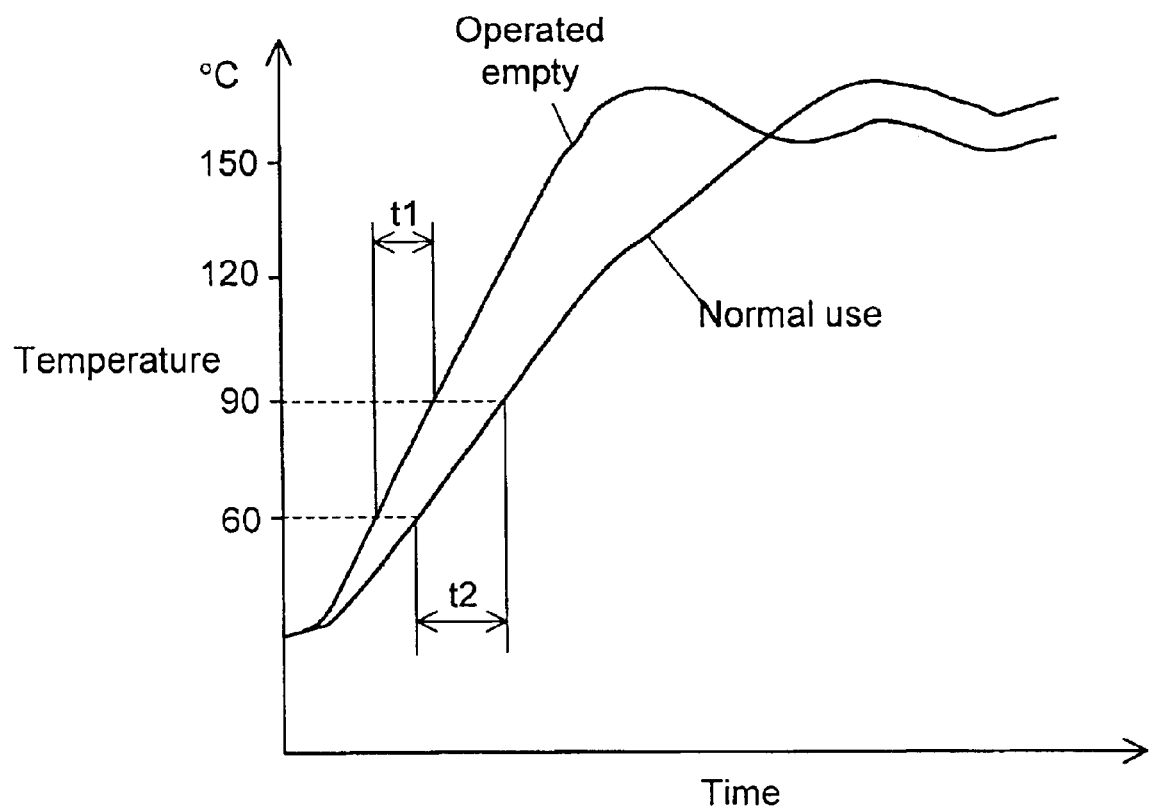
FIG. 7 is a diagram showing temperature characteristic in a baking process of the bread baking machine.

FIG. 7 is a diagram representing changes of temperature over the lapse of time as detected by a temperature detector during the baking process. As shown in FIG. 7, the bread baking machine is provided with temperature detector 28 for sensing temperature inside baking chamber 24, and it is programmed to control the power supply during the bread baking process in such a manner that it discontinues the power supply to heater 27 when a time required for the temperature detected by temperature detector 28 to rise from 60° C. to 90° C. is shorter than a predetermined time "t", and continues the supply to heater 27 when the time is longer than the predetermined time "t". In addition, this predetermined time "t" is set shorter than time "t2" required for the normal use, but longer than time "t1" required when operated empty due to an inadvertent misuse by forgetting to set any of bread container 26, lid container 36 and the like. Because a slope of temperature rise detected by temperature detector 28 becomes steeper and the time required for the temperature to rise from 60° C. to 90° C. becomes shorter than the predetermined time "t" when operated empty by error, the above time setting makes possible to discontinue the power supply to heater 27, as temperature detector 28 determines it as an abnormal use such as empty operation. This can thus prevent any damage and failure of the baking machine such as thermal deformation and the like attributed to abnormal temperature rise of individual components. In the first exemplary embodiment, the slope of temperature rise is examined between 60° C. and 90° C., as the temperature rise is not likely to deviate due to external factors between these points, but the temperature increases rather steadily. Accordingly, this range of detecting the slope of temperature rise is not fixed, but it can be set to any range as appropriate depending on a structure of the main body as needless to mention. Likewise, the predetermined time "t" may also be changed according to the structure of the main body.

Moreover, this structure has latching member 40 for latching shutter plate 38 and grip 72 consolidated and arranged to the same side of lid container 36, so as to reduce a dead space in lid container 36 to the minimum, and increase a capacity of lid container 36. Since consolidation of the components associated with latching member 40 to the same side with grip 72 makes lid container 36 shift the weight toward the side of grip 72, the user can handle the heavier side of lid container 36, which ensures handling ease for removal and replacement of lid container 36.

Furthermore, solenoid 63 for driving latching member 40 is placed inside controller panel 62, and latching member 40 and the grip are arranged next to controller panel 62. Since this structure allows arrangement of latching member 40 and solenoid 63 in the shortest distance, it can realize downsizing of components that lie between them for transferring the driving force, and improve reliability of operation of latching member 40 and shutter plate 38.

In addition, lid container 36 and controller panel 62 are arranged adjacent to each other and controller panel 62 is located at the right side of the baking machine as facing toward the front panel. Since this gives grip 72 of lid container 36 in a position at the right side of the machine as facing toward the front panel, it makes grip 72 easy to handle with a right hand, and the user can also handle both lid container 36 and controller panel 62 in a series of fluent motion without moving his hand around many locations, thereby improving handling ease for removal and replacement of lid container 36.

Also, grip 72 is constructed of the concavity formed in the upper surface of lid container 36, and rib 73 is formed at one side on upper end of grip 72. Since this structure makes grip 72 easy to hold and rib 73 serve as a stopper of a finger tip to avoid it from slipping when grip 72 is held, and thereby they improve handling ease for removal and replacement of lid container 36. In addition, since rib 73 increases rigidity of the upper side end of grip 72, it can improve strength and prevent grip 72 from being damaged.

Further, latching member 40 is attached to lid container 36 via leaf spring 66 in a freely turnable manner, fixing tab 67 to be engaged with lid container receptacle 37 is formed on leaf spring 66, and ribs 69 are so formed on lid container 36 that they encircle around leaf spring 66 and latching member 40. Because this structure requires only leaf spring 66 to secure latching member 40 in addition to securing lid container 36 to lid container receptacle 37, it can reduce a number of components and provide the product less costly. Also, since lid container 36 is engaged to lid container receptacle 37 via latching member 40, lid container 36 does not slip off lid container receptacle 37 even if outer cover 33 is opened with container cover 47 kept open, thereby preventing lid container 36 from being broken and a floor surface from being damaged. In addition, since this structure avoid edges of leaf spring 66 and latching member 40 from being exposed, it ensures safety and improves reliability of product by preventing the hand, scrubbing sponge and the like from coming in contact to edges of leaf spring 66 and latching member 40 while cleaning, so as to avoid injuries as well as stresses and damages to the components.

In the first exemplary embodiment, although leaf spring 66 is used to secure latching member 40 and lid container 36, the same leaf spring 66 may also be used to provide a thrusting force for latching member 40. This can make the spring A unnecessary, thereby reducing a number of components as well as a number of assembly steps to help reduce the cost and improve the reliability.

Moreover, there is hook 42 formed on one end of latching member 40, which is turnably attached to lid container 36, for latching shutter plate 38, and it has protrusion 43 on a tip end thereof. Shutter plate 38 normally receives a stress and impact in a direction to open it when supplementary bread ingredient such as raisins is placed and outer cover 33 is closed, and the stress and/or impact cause the side of poly-angular hole 41 in outer cover 33 to depresses the upper face of hook 42 downward in the direction to turn latching member 40. However, protrusion 43 prevents latching member 40 from turning further, as it is stuck to shutter plate 38 at the upper side of poly-angular hole 41, so as to prevent shutter plate 38 from opening incidentally.

(Second Exemplary Embodiment)

Figure 8:
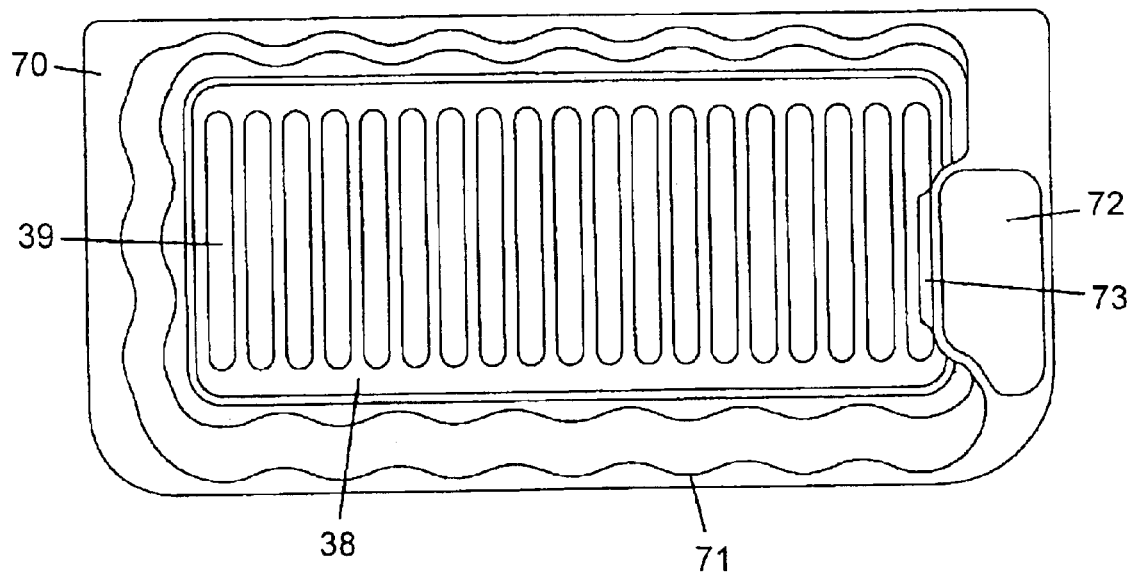
FIG. 8 is a plan view of a lid container of a bread baking machine according to a second exemplary embodiment of this invention.
Figure 9:
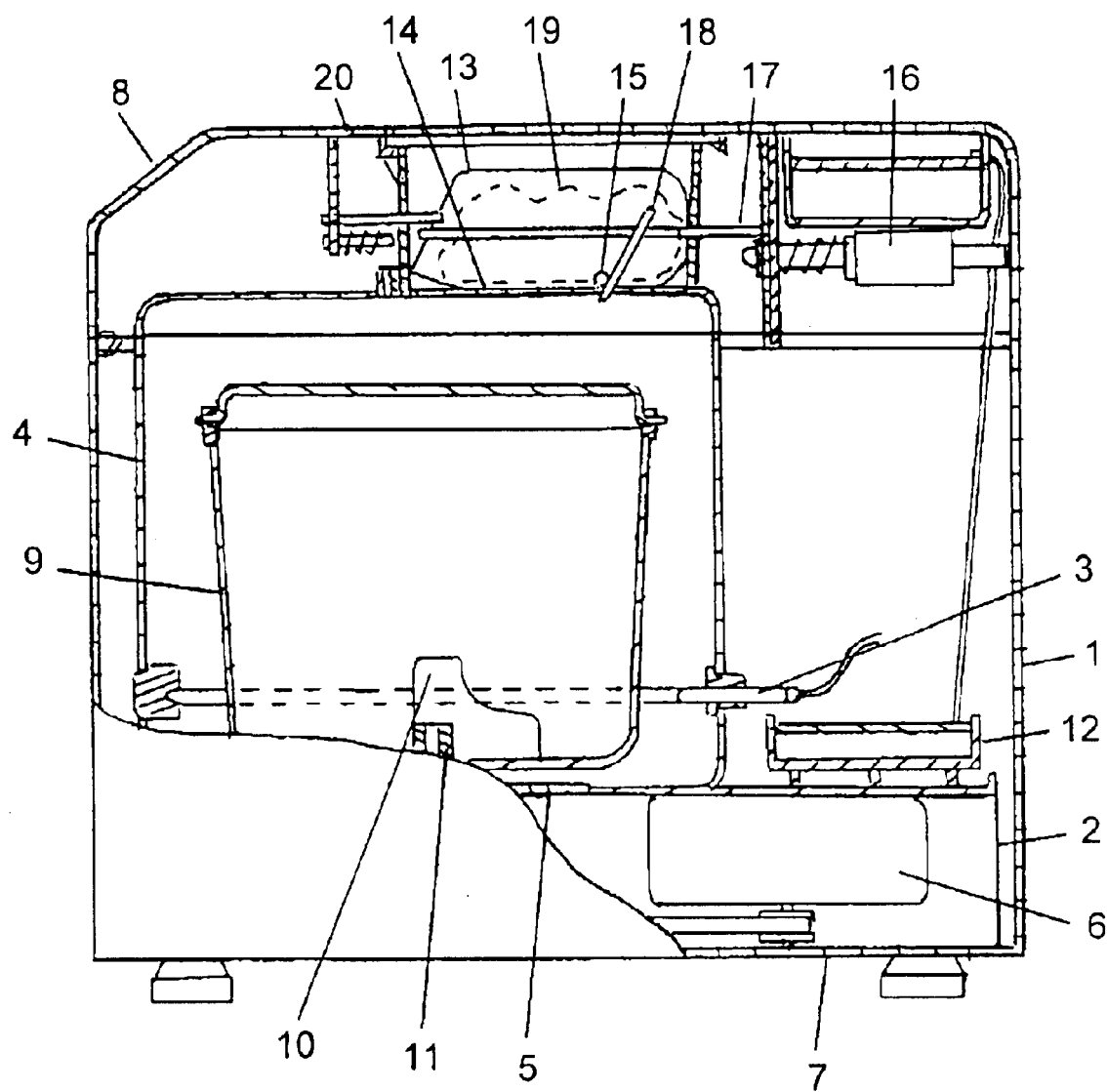
FIG. 9 is a longitudinally sectioned view of a bread baking machine of the prior art.
Figure 10A:
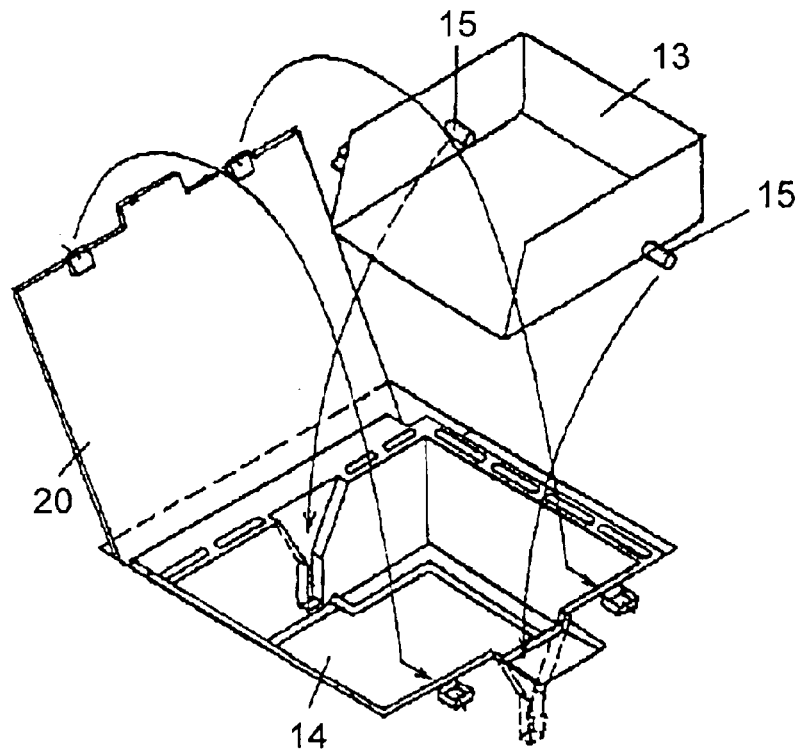
FIG. 10A is a perspective view showing a removable structure of a lid container of the bread baking machine of the prior art.
Figure 10B:
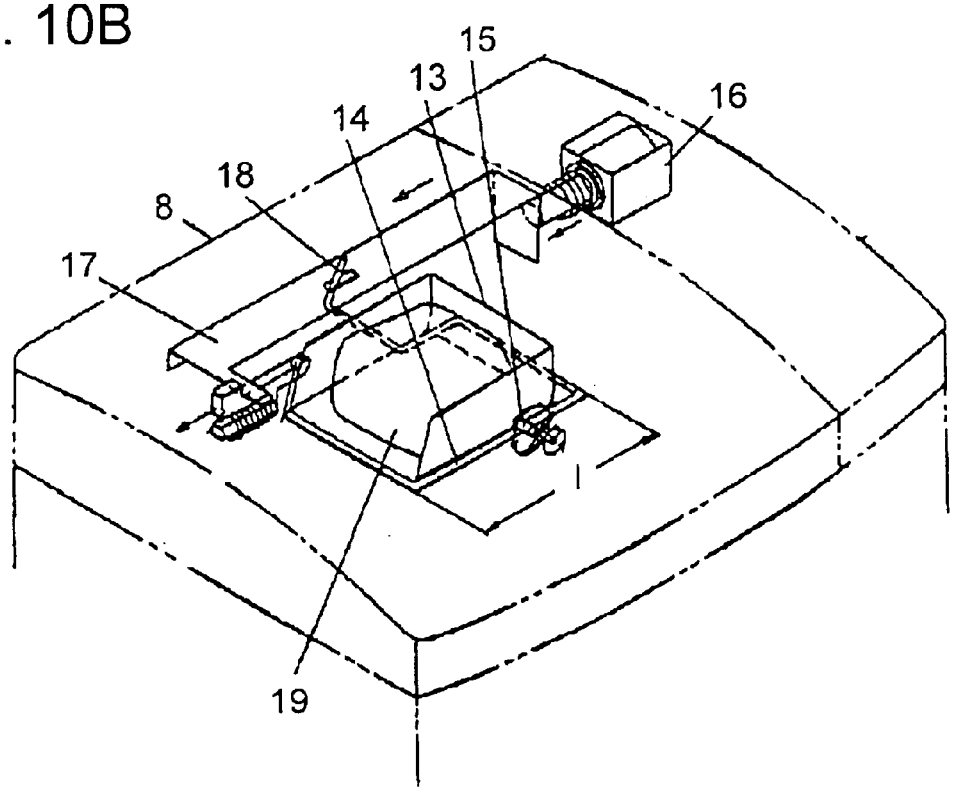
FIG. 10B is a perspective view showing an operating mechanism of the lid container of the bread baking machine of the prior art.

FIG. 8 is a plan view of a lid container of a bread baking machine according to the second exemplary embodiment. Since a basic structure of the second exemplary embodiment is same as that of the first exemplary embodiment, description will be provided mainly of the different points. In addition, like reference numerals are used to designate components of like functions as those of the first exemplary embodiment, and details of them will be skipped. In FIG. 8, lid container 70 stores supplementary bread ingredient such as raisins, nuts and the like, and it is disposed in a freely removable manner to the inside of outer cover 33 above bread container 26. Lid container 70 is provided with shutter plate 38 having a plurality of ridges and ditches 39 and covered with fluorine coating. Also, lid container 70 has an inner wall, where the supplementary ingredient comes in contact, formed with a plurality of wavy surfaces 71 in the vertical direction, and it is provided with grip 72 formed in a size to fit a fingertip, and rib 73 for serving as a stopper to avoid the fingertip from slipping when lid container 70 is being gripped.

In the second exemplary embodiment described above, since the inner wall of lid container 70 comprises the plurality of wavy surfaces, and shutter plate 38 is provided on its surface with the plurality of ridges and ditches 39, they can reduce an area of the surfaces which the supplementary ingredient comes in contact with. As a result, the supplementary ingredient does not make close adhesion over a large surface area and hardly stick to the inner wall of lid container 70 and the surface of shutter plate 38, thereby avoiding the ingredient from remaining therein, even when the supplementary ingredient of highly adhesive material is used. In this embodiment, the inner wall of lid container 70 may be formed into a plurality of projections and depressions or by crimping method instead of making the wavy surfaces, so as to reduce the surface area of adhesion with the supplementary ingredient and to avoid the ingredient from remaining therein in the same way as above.

According to the present invention as described above, the baking machine is able to avoid hot air from escaping, so as to prevent dew condensation and thermal deformation. In addition, it can improve function of the lid container as well as the components nearby, thereby realizing betterment of benefit and convenience.

(Third Exemplary Embodiment)

Figure 11A:
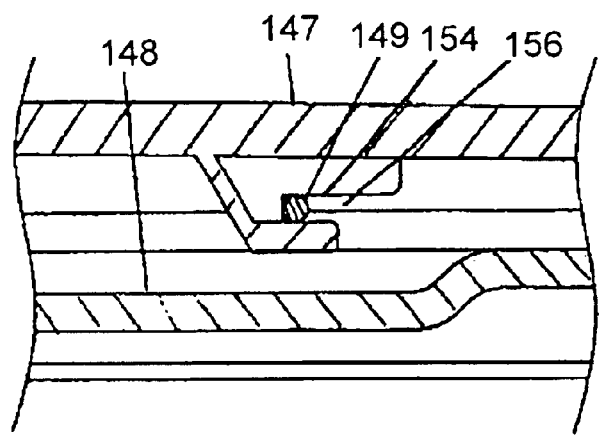
FIG. 11A is a sectional view depicting a wire rod engagement portion constructed of a groove in a container cover of a bread baking machine according to a third exemplary embodiment of this invention.
Figure 11B:
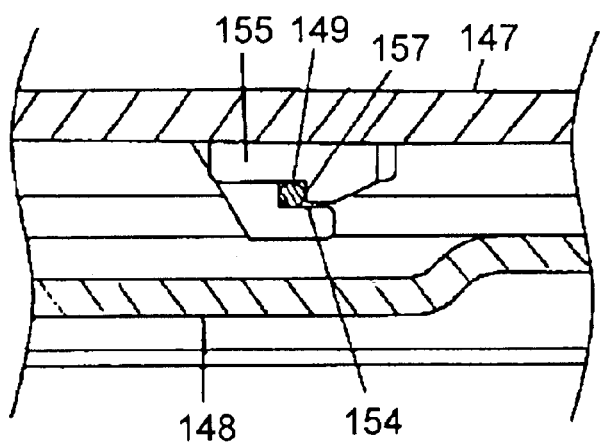
FIG. 11B is a sectional view depicting another wire rod engagement portion constructed of a rib in the container cover of the bread baking machine.
Figure 11C:
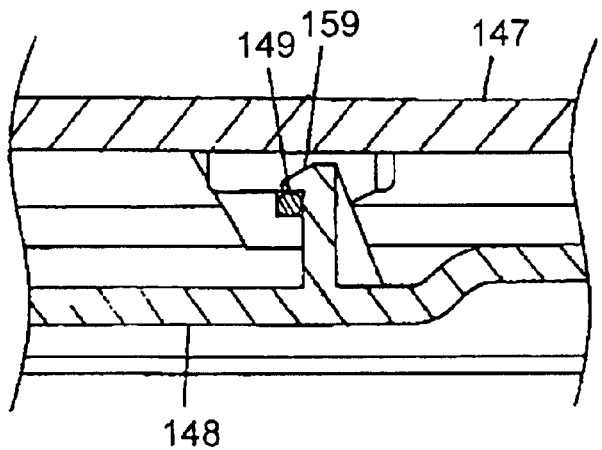
FIG. 11C is a sectional view showing a hook of an inner cover of the bread baking machine.

FIG. 11A is a sectional view of a wire rod engagement portion constructed of a groove in a container cover, FIG. 11B is a sectional view of another wire rod engagement portion constructed of a rib in the like container cover, and FIG. 11C is a sectional view of a hook of the like inner cover.

In FIG. 11A through FIG. 11C, container cover 147 is provided with fixing members 149 made of piano wires attached to both right and left sides thereof, and inner cover 148 is mounted by engaging latching hooks 159 to these fixing members 149. Inner cover 148 which reaches high temperature can be thus mounted without using a screw which is liable to conductive the heat easily. This can therefore alleviate temperature rise of container cover 147 and prevent it from developing abnormalities such as thermal deformation, thermal deterioration and the like, so as to ensure reliability in resisting to heat.

In the third exemplary embodiment, although lid container 147 has a removable structure, this structure may be altered to fix lid container 147 while still obtaining like advantage as noted above.

Also, fixing member 149 for movably supporting inner cover 148 can be attached easily to container cover 147 by forming only thin-walled ribs on an upper body of container cover 147, when the engagement portion of fixing member 149 comprises ribs 155 and grooves 154 having openings 156 at one side, and fixing member 149 is engaged with ribs 155 and grooves 154 to attach it to container cover 147. This can prevent a draw in the upper body of container cover 147 even when it is molded of a plastic resin.

Furthermore, the structure may be such that container cover 147 has positioning rib 158 provided in a protruding manner toward and adjacent to inner cover 148 with a space maintained along the periphery thereof, and that positioning rib 158 is formed to a height sufficient to overlap with inner cover 148. This structure allows inner cover 148 to be attached freely movably to container cover 147, and ensures mounting strength of inner cover 148 as it is unlikely to come off even if it is pulled and/or pushed, since movement of inner cover 148 is restricted in the horizontal direction by positioning rib 158 and in the vertical direction by latching hook 159 and a space between the upper body of container cover 147 and fixing members 149 when inner cover 148 moves from front to back, right to left and up to down within a range of the space around latching hook 159.

(Fourth Exemplary Embodiment)

Figure 12A:
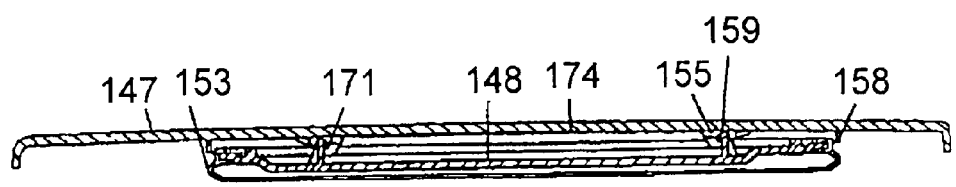
FIG. 12A is a longitudinally sectioned view of a container cover of a bread baking machine according to a fourth exemplary embodiment of this invention.
Figure 12B:
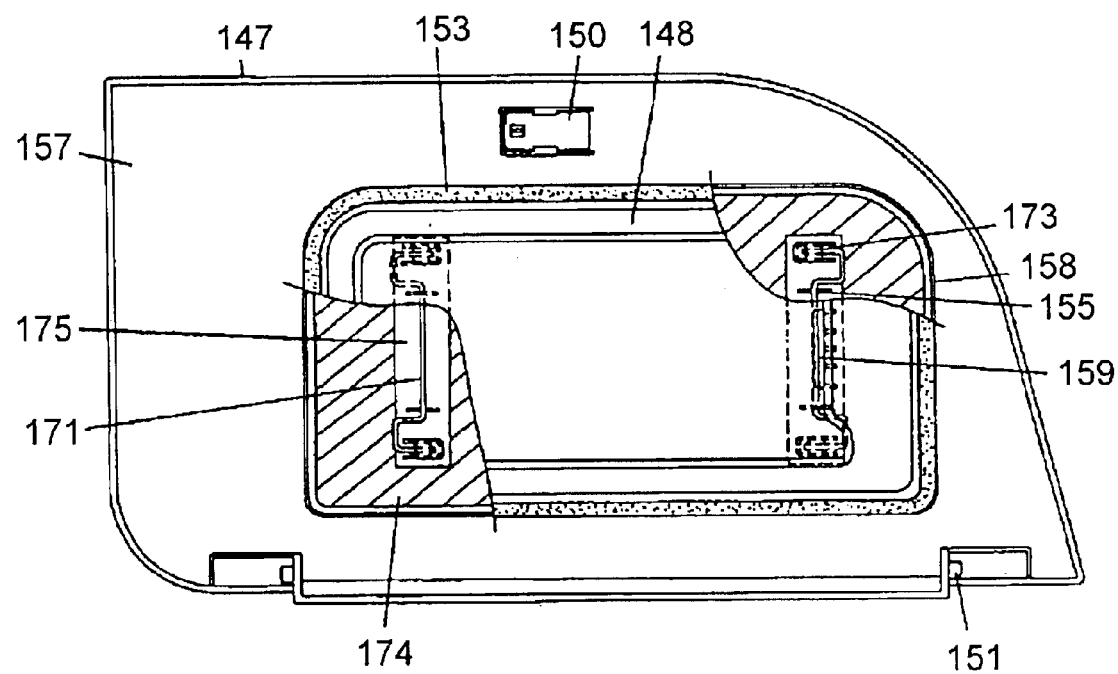
FIG. 12B is a plan view showing a back side of the container cover of the bread baking machine according to the fourth exemplary embodiment.
Figure 13A:
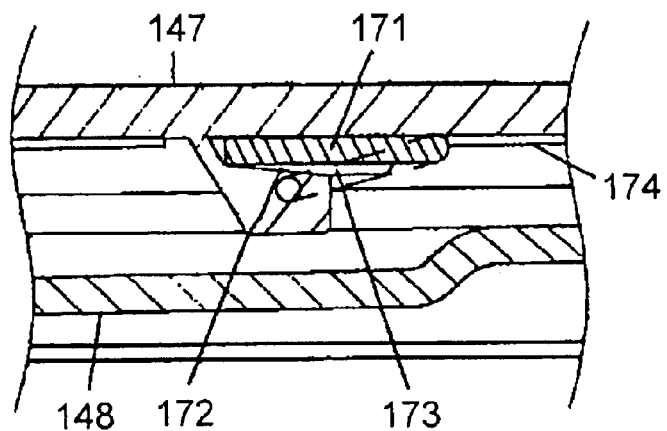
FIG. 13A is a sectional view depicting a wire rod engagement portion constructed of a hole in the container cover of the bread baking machine according to the fourth exemplary embodiment.
Figure 13B:
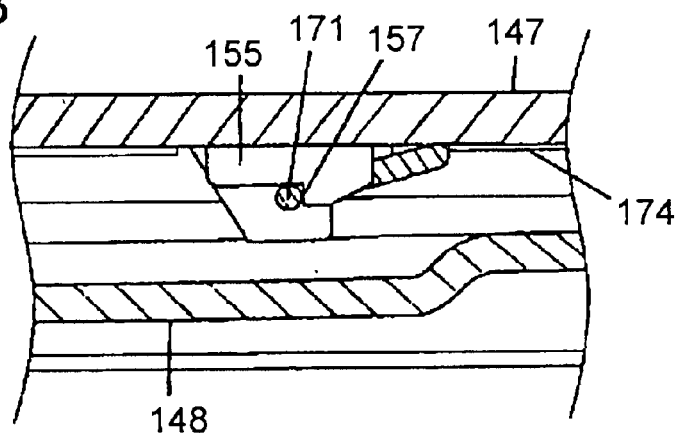
FIG. 13B is a sectional view depicting another wire rod engagement portion constructed of a rib in the container cover of the bread baking machine.
Figure 13C:
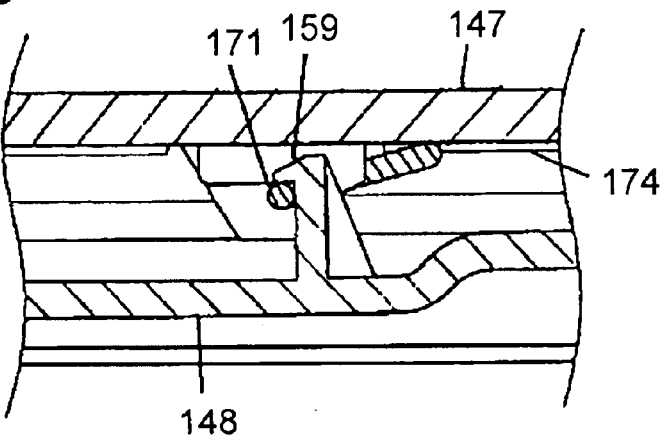
FIG. 13C is a sectional view showing a hook of an inner cover of the bread baking machine.

FIG. 12A is a longitudinally sectioned view of a container cover of a bread baking machine according to the fourth exemplary embodiment, FIG. 12B is a plan view showing a back side of the same container cover, FIG. 13A is a sectional view of a wire rod engagement portion constructed of a hole in the like container cover, FIG. 13B is a sectional view of another wire rod engagement portion constructed of a rib in the like container cover, and FIG. 13C is a sectional view showing a hook of an inner cover of the same.

In FIG. 12A through FIG. 13C, fixing members 171 are formed of piano wires and they hold inner cover 148 in a freely movable manner. Container cover 147 is provided with a plurality of holes 172 for mounting fixing members 171 by insertion of tip ends thereof. There are also openings 173 formed at both sides for making fixing members 171 insertable. Aluminum tape 174 is placed on an inner surface of container cover 147 above inner cover 148. Aluminum tape 174 is provided with cut openings 175 for averting interference by ribs 155 and holes 172 that constitute the engagement portions of fixing members 171.

In the above fourth exemplary embodiment, the engagement portions of fixing members 171 comprise ribs 155 and holes 172 having openings 173 at one side, and fixing members 171 are engaged with ribs 155 and holes 172 to attach them to container cover 147. Thus, fixing members 171 for movably supporting inner cover 148 can be attached easily to container cover 147 by forming only thin-walled ribs on an upper body of container cover 147. This can also prevent a draw in the upper body of container cover 147 even when it is molded of a plastic resin. In addition, since this structure can increase a length of each of contacting portions between fixing members 171 and holes 172, which disperses a stress over the entire length even if an impact is impressed when it is dropped or the like happens, it prevents the engagement portions of fixing members 171 for supporting inner cover 148 from being cracked or damaged thereby improving their strength. In the fourth exemplary embodiment, although holes 172 are not perforated through, they may be perforated holes to obtain the same advantageous effect as discussed above.

In the baking process during which heater 127 is energized continuously and temperature inside of baking chamber 124 becomes very high, a great degree of heat is radiated from inner cover 148 covering an opening above baking chamber 124, when shutter plate 138 is opened. However, because of aluminum tape 174 placed on the inner surface of container cover 147 above inner cover 148, the radiant heat is reflected, and thereby it can alleviate temperature rise of container cover 147, and avoid thermal deformation such as warping.

In the fourth exemplary embodiment, although aluminum tape 174 is used as a heat reflecting material placed on container cover 147, it may be substituted by any of a polyester film tape and a stainless steel tape, instead of aluminum. Or, any of an aluminum sheet and a polyester film can be used by securing it physically in such a manner as to hold it between adjoining components, rather than using the tape-form material. Like effect can be attained so long as the material has resistances to both heat and corrosion sufficient to withstand the use environment and is capable of reflecting the radiant heat.

(Fifth Exemplary Embodiment)

Figure 14A:
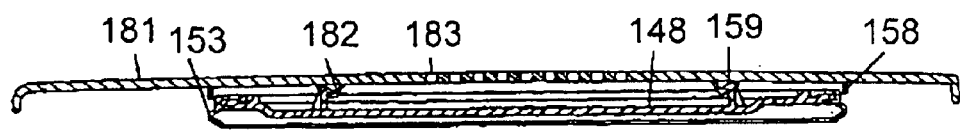
FIG. 14A is a longitudinally sectioned view of a container cover of a bread baking machine according to a fifth exemplary embodiment of this invention.
Figure 14B:
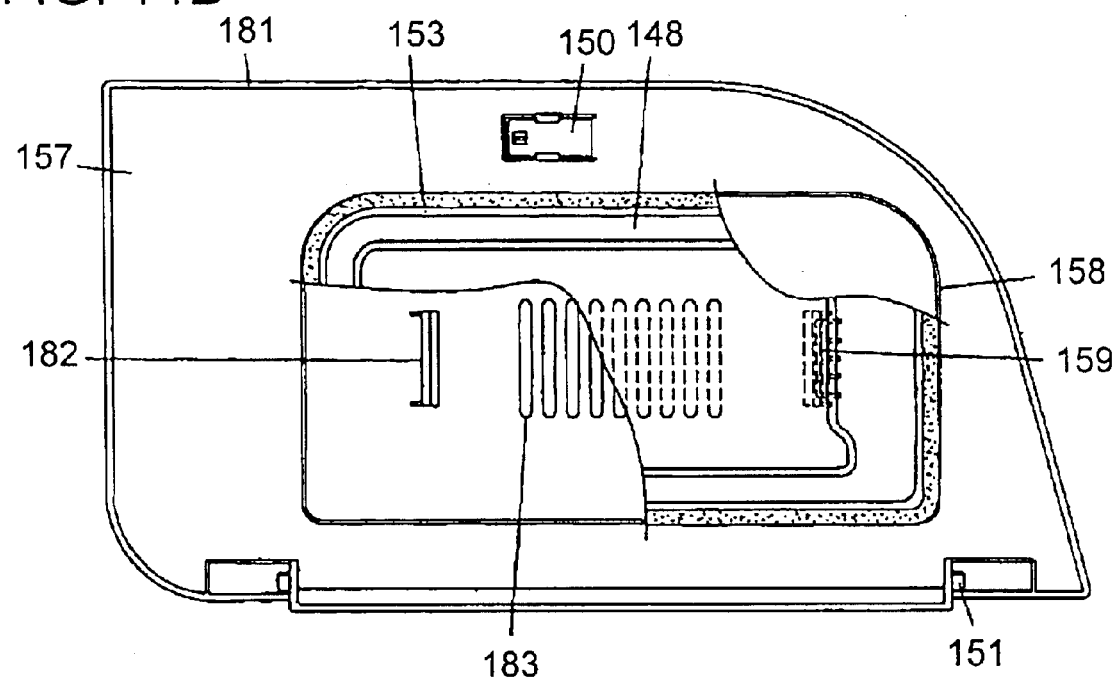
FIG. 14B is a plan view showing a back side of the container cover of the bread baking machine of the fifth exemplary embodiment.

FIG. 14A is a longitudinally sectioned view of a container cover of a bread baking machine according to the fifth exemplary embodiment, and FIG. 14B is a plan view showing a back side of the same container cover.

In FIG. 14A and FIG. 14B, container cover 181 is attached to outer cover 133 in a freely turnable and removable manner for opening and closing lid container 136, and it is provided with a plurality of fixing tab mounts 182 in engagement with fixing tabs 159 of inner cover 148. Container cover 181 is also provided with a plurality of vent openings 183 in an upper body thereof above inner cover 148. There is a space around fixing tabs 159, so that inner cover 148 is mounted to container cover 181 in a freely movable manner in the directions of front to back, left to right, and up to down.

In the fifth exemplary embodiment described above, inner cover 148 is provided with fixing tabs 159, container cover 181 is provided with fixing tab mounts 182 in engagement with fixing tabs 159, and the space is maintained around fixing tabs 159. Because of the above structure, inner cover 148 can be attached to container cover 181 in a freely movable manner by engaging fixing tabs 159 to fixing tab mounts 182 without using wire rods. This can thus provide reliable seal while reducing a number of components at the same time.

Furthermore, by having the plurality of vent openings 183 formed in container cover 181 in an area above inner cover 148, the heat radiated by inner cover 148 is vented outside from vent openings 183 located above it, even when inner cover 148 becomes very hot during the baking process in which heater 127 is energized continuously. This can prevent the heat from staying in a space between container cover 181 and inner cover 148, and alleviate temperature rise of container cover 181, so as to avoid thermal deformation such as warping.

According to the present invention, the bread baking machine is so constructed as to ensure reliable seal and prevent dew condensation as well as thermal deformation on the outer cover and container cover even though it is provided with the lid container for entering supplementary bread ingredient inside the outer cover, since the inner cover for opening and closing the upper opening of lid container can be attached in a movable manner without producing a draw in the upper body of the container cover.

What is claimed is:

1. A bread baking machine comprising:
   a bread container for mixing, kneading and heating bread ingredients;
   a baking chamber provided with a heater;
   a lid for opening and closing said baking chamber;
   a lid container provided in said lid for storing a supplementary ingredient of bread;
   a container cover for opening and closing said lid container;
   a gasket provided between said lid container and said container cover;
   enter means for opening the bottom of said lid container to enter said supplementary ingredient into said bread container;
   control means for controlling a baking process; and
   locking means for locking said lid and said container cover,
   wherein said bread baking machine uses said locking means to lock said lid and said container cover for preventing substantially hot air from escaping to the outside through the periphery of said container cover.

2. The bread baking machine according to claim 1, wherein said gasket is attached to said container cover.

3. The bread baking machine according to claim 1, wherein an inner cover for opening and closing an opening of said lid container is mounted to said container cover in a movable manner.

4. The bread baking machine according to claim 3, wherein said gasket is attached to at least one of said container cover and said inner cover.

5. The bread baking machine according to one of claim 1, wherein said locking means is disposed between a hinge of said container cover and a controller panel, and said gasket is disposed between said locking means and said hinge.

6. The bread baking machine according to any of claim 3, wherein said inner cover is mounted in a movable manner to said container cover via a fixing member.

7. The bread baking machine according to any of claim 3, wherein said lid container is placed in said lid in a removable manner, a lid container receptacle for placing said lid container is arranged around the outer periphery of said lid container, and said inner cover is substantially in abutment with one of said lid container receptacle and said lid container over the entire periphery at an interior side of said gasket.

8. The bread baking machine according to claim 6, wherein said lid container is placed in said lid in a removable manner, a lid container receptacle for placing said lid container is arranged around the outer periphery of said lid container, and said inner cover is in abutment with one of said lid container receptacle and said lid container substantially over the entire periphery at an interior side of said gasket.

9. The bread baking machine according to claim 7, wherein said gasket comes in abutment with said lid container receptacle to provide sealing.

10. The bread baking machine according to claim 8, wherein said gasket comes in abutment with said lid container receptacle to provide sealing.

11. The bread baking machine according to one of claim 1, wherein an inner wall of said lid container comprises any of a wavy surface and a plurality of ridges and ditches.

12. The bread baking machine according to claim 7, wherein an inner wall of said lid container comprises any of a wavy surface and a plurality of ridges and ditches.

13. The bread baking machine according to claim 8, wherein an inner wall of said lid container comprises any of a wavy surface and a plurality of ridges and ditches.

14. The bread baking machine according to claim 9, wherein an inner wall of said lid container comprises any of a wavy surface and a plurality of ridges and ditches.

15. The bread baking machine according to claim 10, wherein an inner wall of said lid container comprises any of a wavy surface and a plurality of ridges and ditches.

16. The bread baking machine according to claim 7 further comprising a latching member for latching said enter means in the bottom of said lid container, and a grip to be held when removing and replacing said lid container,
wherein said latching member and said grip are arranged at same side surface of said lid container.

17. The bread baking machine according to claim 8 further comprising a latching member for latching said enter means in the bottom of said lid container, and a grip to be held when removing and replacing said lid container,
wherein said latching member and said grip are arranged at same side surface of said lid container.

18. The bread baking machine according to claim 16, wherein a solenoid for driving said latching member is disposed inside a controller panel, and said latching member and said grip are arranged next to said controller panel.

19. The bread baking machine according to claim 17, wherein a solenoid for driving said latching member is disposed inside a controller panel, and said latching member and said grip are arranged next to said controller panel.

20. The bread baking machine according to claim 16, wherein said controller panel is located at the right side of said baking machine as facing toward a front panel thereof.

21. The bread baking machine according to claim 17, wherein said controller panel is located at the right side of said baking machine as facing toward a front panel thereof.

22. The bread baking machine according to claim 16, wherein said grip comprises a concavity formed in an upper surface of said lid container, and a rib is formed on the upper surface next to said grip.

23. The bread baking machine according to claim 17, wherein said grip comprises a concavity formed in an upper surface of said lid container, and a rib is formed on the upper surface next to said grip.

24. The bread baking machine according to claim 16, wherein said latching member is turnably attached to said lid container via a leaf spring, said leaf spring has a fixing tab formed thereon for attaching said latching member to said lid container, and a periphery of said leaf spring and said fixing tab is encircled with any of a rib and a barrier formed on said lid container.

25. The bread baking machine according to claim 17, wherein said latching member is turnably attached to said lid container via a leaf spring, said leaf spring has a fixing tab formed thereon for attaching said latching member to said lid container, and a periphery of said leaf spring and said fixing tab is encircled with any of a rib and a barrier formed on said lid container.

26. The bread baking machine according to claim 16, wherein said latching member is turnably attached to said lid container via a leaf spring, said leaf spring has a fixing tab formed thereon for attaching said latching member to said lid container, and a periphery of said leaf spring and said fixing tab is encircled with any of a rib and a barrier formed on said lid container.

27. The bread baking machine according to claim 17, wherein said latching member is turnably attached to said lid container via a leaf spring, said leaf spring has a fixing tab formed thereon for attaching said latching member to said lid container, and a periphery of said leaf spring and said fixing tab is encircled with any of a rib and a barrier formed on said lid container.

28. The bread baking machine according to claim 16, wherein said latching member attached turnably to said lid container has a hook formed at one end thereof for engagement with a shutter plate, and said hook is provided with a protrusion at a tip end thereof.

29. The bread baking machine according to claim 17, wherein said latching member attached turnably to said lid container has a hook formed at one end thereof for engagement with a shutter plate, and said hook is provided with a protrusion at a tip end thereof.

30. The bread baking machine according to claim 24, wherein said latching member attached turnably to said lid container has a hook formed at one end thereof for engagement with a shutter plate, and said hook is provided with a protrusion at a tip end thereof.

31. The bread baking machine according to claim 25, wherein said latching member attached turnably to said lid container has a hook formed at one end thereof for engagement with a shutter plate, and said hook is provided with a protrusion at a tip end thereof.

32. The bread baking machine according to claim 26, wherein said latching member attached turnably to said lid container has a hook formed at one end thereof for engagement with a shutter plate, and said hook is provided with a protrusion at a tip end thereof.

33. The bread baking machine according to claim 27, wherein said latching member attached turnably to said lid container has a hook formed at one end thereof for engagement with a shutter plate, and said hook is provided with a protrusion at a tip end thereof.

34. The bread baking machine according to claim 3, wherein said container cover is provided with a mounting constituting a wire rod engagement portion in engagement with a wire rod, said inner cover is provided with a fixing member in connection with said wire rod, and said inner cover is attached in a movable manner to said container cover with said wire rod.

35. The bread baking machine according to claim 34, wherein said wire rod engagement portion comprises a rib and a groove having an opening at one side, and said wire rod is attached to said container cover via engagement with said rib and said groove.

36. The bread baking machine according to claim 34, wherein said wire rod engagement portion comprises a rib and a hole having an opening at one side, and said wire rod is attached to said container cover via engagement with said rib and said hole.

37. The bread baking machine according to claim 3, wherein said inner cover is provided with a fixing tab, and said container cover is provided with a fixing tab mount for engagement to said fixing tab, and said inner cover is attached to said container cover in a movable manner with a space provided around said fixing tab.

38. The bread baking machine according to claim 37 further having a heat reflecting material placed on an inner surface of said container cover above said inner cover.

39. The bread baking machine according to claim 37, wherein said container cover is provided with a plurality of vent openings formed in an area above said inner cover.

40. The bread baking machine according to claim 37, wherein said container cover has a rib formed in a protruding manner toward and adjacent to said inner cover to a height sufficient to overlap with said inner cover.

* * * * *